(12) United States Patent
Carothers

(10) Patent No.: US 12,332,383 B2
(45) Date of Patent: Jun. 17, 2025

(54) COMPACT CHIP SCALE LIDAR SOLUTION

(71) Applicant: TEXAS INSTRUMENTS INCORPORATED, Dallas, TX (US)

(72) Inventor: Daniel Nelson Carothers, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 141 days.

(21) Appl. No.: 16/896,590

(22) Filed: Jun. 9, 2020

(65) Prior Publication Data

US 2020/0300974 A1    Sep. 24, 2020

Related U.S. Application Data

(63) Continuation of application No. 16/248,948, filed on Jan. 16, 2019, now Pat. No. 10,712,433, which is a continuation of application No. 14/947,249, filed on Nov. 20, 2015, now Pat. No. 10,215,846.

(51) Int. Cl.
| | |
|---|---|
| G01C 3/08 | (2006.01) |
| G01S 7/481 | (2006.01) |
| G01S 7/484 | (2006.01) |
| G01S 17/02 | (2020.01) |
| G01S 17/10 | (2020.01) |

(52) U.S. Cl.
CPC ............ *G01S 7/484* (2013.01); *G01S 7/4817* (2013.01); *G01S 17/02* (2013.01); *G01S 17/10* (2013.01)

(58) Field of Classification Search
CPC ........ G01S 7/484; G01S 7/4817; G01S 17/02; G01S 17/10
See application file for complete search history.

(56) References Cited

U.S. PATENT DOCUMENTS

| | | | |
|---|---|---|---|
| 3,521,192 A | 7/1970 | Maria et al. | |
| H341 H * | 10/1987 | Mongeon | G01C 1/00 356/139.08 |
| 4,859,055 A | 8/1989 | Gal et al. | |

(Continued)

FOREIGN PATENT DOCUMENTS

| | | |
|---|---|---|
| CN | 1755393 A | 4/2006 |
| CN | 103576162 A | 2/2014 |

(Continued)

OTHER PUBLICATIONS

Notification of First CN Office Action for PRC (China) Pat. Appln. No. 201680065356.0; Office action issued :Oct. 22, 2021.

(Continued)

*Primary Examiner* — Mark Hellner
(74) *Attorney, Agent, or Firm* — Frank D. Cimino

(57) ABSTRACT

A LIDAR system includes a static monolithic LIDAR transceiver, a collimating optic, and a first rotatable wedge prism. The static monolithic LIDAR transceiver is configured to transmit a laser beam and receive reflected laser light from a first target object. The collimating optic is configured to narrow the transmitted laser beam to produce a collimated laser beam. The first rotatable wedge prism is configured to steer the collimated laser beam in a direction of the first target object based on the first rotatable wedge prism being in a first position.

28 Claims, 4 Drawing Sheets

(56) References Cited

U.S. PATENT DOCUMENTS

| | | | | |
|---|---|---|---|---|
| 5,249,046 | A | * | 9/1993 | Ulich .................. G01S 17/89 348/81 |
| 6,646,479 | B1 | * | 11/2003 | Crawford ............. H03K 5/082 327/68 |
| 7,236,299 | B1 | | 6/2007 | Smith |
| 7,936,448 | B2 | | 5/2011 | Albuquerque et al. |
| 8,503,046 | B2 | * | 8/2013 | Mikkelsen ......... G02B 26/0891 358/475 |
| 8,829,417 | B2 | | 9/2014 | Krill et al. |
| 8,995,485 | B2 | | 3/2015 | Joseph et al. |
| 9,575,184 | B2 | * | 2/2017 | Gilliland ............. G01S 17/10 |
| 9,751,555 | B2 | * | 9/2017 | Sekiya ................. B62D 5/046 |
| 9,791,555 | B2 | | 10/2017 | Zhu |
| 10,215,846 | B2 | | 2/2019 | Carothers |
| 2003/0012248 | A1 | * | 1/2003 | Akerlund ............. G02B 26/10 372/93 |
| 2004/0036934 | A1 | * | 2/2004 | Dube ................ G02B 26/0875 359/196.1 |
| 2005/0249502 | A1 | | 11/2005 | Chen et al. |
| 2006/0072099 | A1 | | 4/2006 | Hoashi |
| 2007/0181810 | A1 | | 8/2007 | Tan et al. |
| 2009/0323203 | A1 | | 12/2009 | Adams et al. |
| 2010/0271614 | A1 | * | 10/2010 | Albuquerque ........ G01S 7/4811 356/4.01 |
| 2011/0051121 | A1 | | 3/2011 | Degnan, III et al. |
| 2011/0122900 | A1 | | 5/2011 | Sibbett et al. |
| 2011/0149268 | A1 | | 6/2011 | Marchant et al. |
| 2011/0255563 | A1 | | 10/2011 | Heyne et al. |
| 2013/0083389 | A1 | * | 4/2013 | Dakin ................ G01S 17/58 359/341.1 |
| 2013/0241761 | A1 | * | 9/2013 | Cooper .................. G02B 26/10 342/54 |
| 2014/0240161 | A1 | | 8/2014 | Davidson |
| 2014/0327902 | A1 | * | 11/2014 | Giger ................... G01S 17/08 356/5.01 |
| 2015/0185313 | A1 | | 7/2015 | Zhu |
| 2016/0161600 | A1 | * | 6/2016 | Eldada .................. G01S 7/4814 356/5.01 |

FOREIGN PATENT DOCUMENTS

| | | | | |
|---|---|---|---|---|
| CN | 104155639 | A | | 11/2014 |
| CN | 104155657 | A | | 11/2014 |
| CN | 104297760 | A | | 1/2015 |
| DE | 3217785 | C | * 12/1983 | ............. G02B 26/10 |
| DE | 3702742 | C1 | * 6/1988 | ............. G01S 7/4812 |
| EP | 2600168 | A1 | * 6/2013 | ............. G01S 17/08 |
| JP | 4054388 | B2 | * 2/2008 | ............. G01B 11/00 |
| KR | 20080106899 | A | * 12/2008 | ............. G01S 7/9811 |
| WO | WO 2004099849 | A1 | * 11/2004 | ............. G02B 5/045 |
| WO | 2013219966 | A1 | * 7/2014 | ............. G01S 7/4868 |

OTHER PUBLICATIONS

PRC (China) Pat. Appln. No. 201680065356.0; first Office Action issued Oct. 22, 2021.

International Search Report for PCT/US2016/063101 mailed Mar. 30, 2017, 3 pages.

Office Action for Chinese Patent Application No. 201680065356.0, Jun. 2, 2022, 5 pages.

* cited by examiner

COMPACT CHIP SCALE LIDAR SOLUTION

CROSS-REFERENCE TO RELATED APPLICATIONS

This application is a continuation of U.S. patent application Ser. No. 16/248,948, filed on Jan. 16, 2019, which is a continuation of U.S. patent application Ser. No. 14/947,249, filed on Nov. 20, 2015, (now U.S. Pat. No. 10,215,846) the entirety of both are hereby incorporated herein by reference.

BACKGROUND

LIDAR is a system that measures the distance to a target object by reflecting a laser pulse off of the target and analyzing the reflected light. More specifically, LIDAR systems typically determine a time of flight (TOF) for the laser pulse to travel from the laser to the target object and return. The distance to the target object then may be determined based on the TOF. These systems may be used in many applications including: geography, geology, geomorphology, seismology, transport, and remote sensing. For example, in transportation, automobiles may include LIDAR systems to monitor the distance between the vehicle and other objects (e.g., another vehicle). The vehicle may utilize the distance determined by the LIDAR system to, for example, determine whether the other object, such as another vehicle, is too close, and automatically apply braking. Conventional LIDAR systems may require multi-chip solutions in which the driver circuitry for the laser and the timing circuitry to determine the TOF are separate circuits.

SUMMARY

The problems noted above are solved in large part by systems and methods for determining distances to target objects utilizing a monolithic LIDAR transceiver. In some embodiments, a LIDAR system includes a static monolithic LIDAR transceiver, a collimating optic, and a first rotatable wedge prism. The static monolithic LIDAR transceiver is configured to transmit a laser beam and receive reflected laser light from a first target object. The collimating optic is configured to narrow the transmitted laser beam to produce a collimated laser beam. The first rotatable wedge prism is configured to steer the collimated laser beam in a direction of the first target object based on the first rotatable wedge prism being in a first position.

Another illustrative embodiment is a method that comprises transmitting, by a monolithic LIDAR transceiver, a laser beam in a first direction. The method may also comprise refracting, by a first wedge prism in a first position and a second wedge prism in a second position, the laser beam in a second direction. The method may also comprise reflecting the laser beam off of a first target object to produce a first reflected light beam in a direction opposite the second direction. The method may also comprise refracting, by the first wedge prism and the second wedge prism the first reflected light beam in a direction opposite the first direction. The method may also comprise receiving, by the monolithic LIDAR transceiver, the first reflected light beam.

Yet another illustrative embodiment is a monolithic LIDAR transceiver comprising a laser and a photodiode coupled to the laser in a single integrated circuit. The laser is configured to generate a laser beam and transmit the laser beam in a first direction to a first rotatable wedge prism and a second rotatable wedge prism. The first and second rotatable wedge prisms are configured to steer the laser beam in a second direction. The photodiode is configured to receive a first reflected light beam. The first reflected light beam comprises the laser beam reflected off of a first target object in a direction opposite the second direction.

BRIEF DESCRIPTION OF THE DRAWINGS

For a detailed description of various examples, reference will now be made to the accompanying drawings in which.

NOTATION AND NOMENCLATURE

Figure 1:
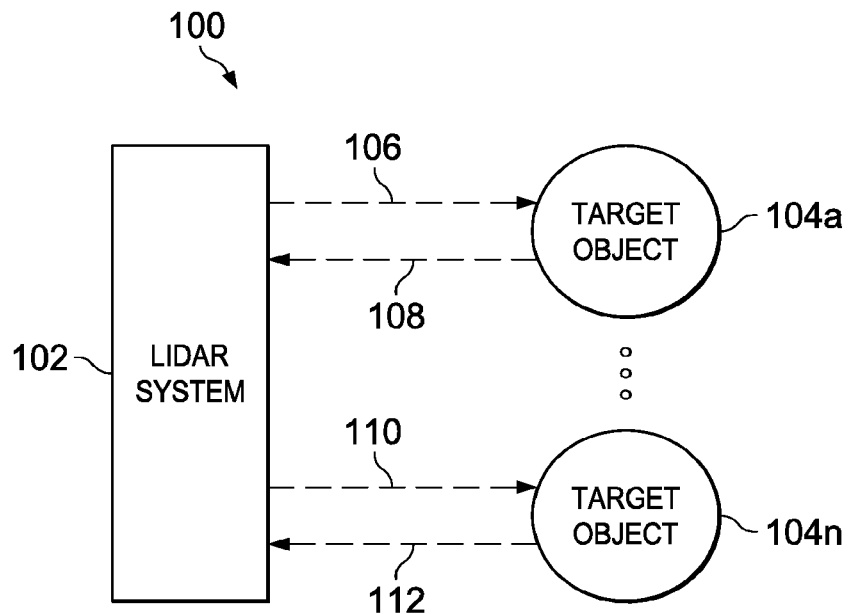
FIG. 1 shows a block diagram of a system for determining distances to a target object in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

LIDAR systems may determine distances to various target objects utilizing the time of flight (TOF) of a laser pulse (i.e., drive pulse) to the target object and its reflection off a target object back to the LIDAR system (return pulse). These systems may be used in many applications including: geography, geology, geomorphology, seismology, transport, and remote sensing. For example, in transportation, automobiles may include LIDAR systems to monitor the distance between the vehicle and other objects (e.g., another vehicle).

The vehicle may utilize the distance determined by the LIDAR system to, for example, determine whether the other object, such as another vehicle, is too close, and automatically apply braking.

In a conventional LIDAR system, a photodiode receives the return pulse (i.e., the reflected laser light from the target object) and converts the photons in the return pulse to a current. This current then is utilized by timing circuitry to determine TOF. Additional processing then may allow the LIDAR system to determine the distance to the target object. Because the photodiode that receives the return pulse requires a large gain so that the timing circuitry can identify the TOF, conventional LIDAR systems utilize multi-chip solutions in which the driver circuitry for the laser and the photodiode, and its associated timing circuitry, are separate circuits. However, a multi-chip solution is less efficient than a single chip solution. Thus, it is desirable to produce a photodiode that is integrated into a single integrated circuit with the driver circuitry and laser so as to efficiently determine distance to target objects utilizing LIDAR.

A monolithic LIDAR transceiver may include a photodiode that is integrated with the driver circuitry and laser. The monolithic LIDAR transceiver may be coupled to a series of wedge prisms to steer the laser pulse (laser beam) to target objects. This system allows the photodiode to generate a sufficient gain such that the timing circuitry may accurately time the return pulse. Therefore, the LIDAR transceiver may be a single integrated circuit producing greater efficiencies than a multi-chip LIDAR solution.

FIG. 1 shows a block diagram of a system 100 for determining distances to a target object in accordance with various embodiments. The system 100 for determining distances to a target object may include a LIDAR system 102 and target objects 104a-n. The ellipsis between the target objects 104a and 104n indicates that there may be any number of target objects 104, although, for clarity, only two are shown. In some embodiments, the LIDAR system 104 is configured to be mounted to an automobile, such as on and/or in the front and/or rear bumper of the automobile, on the roof of the automobile, and/or on the side of the automobile. In other embodiments, the LIDAR system 104 may be mounted in any location on an automobile or any other object.

The LIDAR system 104 is configured to generate and transmit a laser beam 106 (i.e., a drive pulse) and steer (i.e., direct) the laser beam 106 to a target object, such as target object 104a. In some embodiments, the laser beam 106 is a relatively short light pulse. The laser beam 106 reflects off of target object 104a as reflected laser light beam 108 (i.e., a return pulse). The reflected laser light beam 108 is received by LIDAR system 102. The LIDAR system 102 then may be configured to identify the distance from the LIDAR system 102 to the target object 104a based on a time of flight (TOF) of the laser beam 106 and reflected laser light beam 108. More specifically, the LIDAR system 102 may determine the time between the transmission of the laser beam 106 and the receipt by the LIDAR system 102 of the reflected laser light beam 108 (i.e., the TOF). Utilizing this elapsed time and knowing the speed of light, the LIDAR system 102 may calculate and identify the distance to the target object 104a.

In a similar way, the LIDAR system 102 may determine the distance to any number of other target objects 104. For example, LIDAR system 102 may generate a second laser beam 110 (i.e., a second drive pulse) and steer the laser beam 106 to target object 104n. The laser beam 110 reflects off of target object 104n as reflected laser light beam 112 (i.e., a second return pulse). The reflected laser light beam 112 is received by LIDAR system 102. The LIDAR system 102 then may calculate and identify the distance from the LIDAR system 102 to the target object 104n based, in some embodiments, on the TOF of the laser beam 110 and the reflected laser light beam 112.

Figure 2:
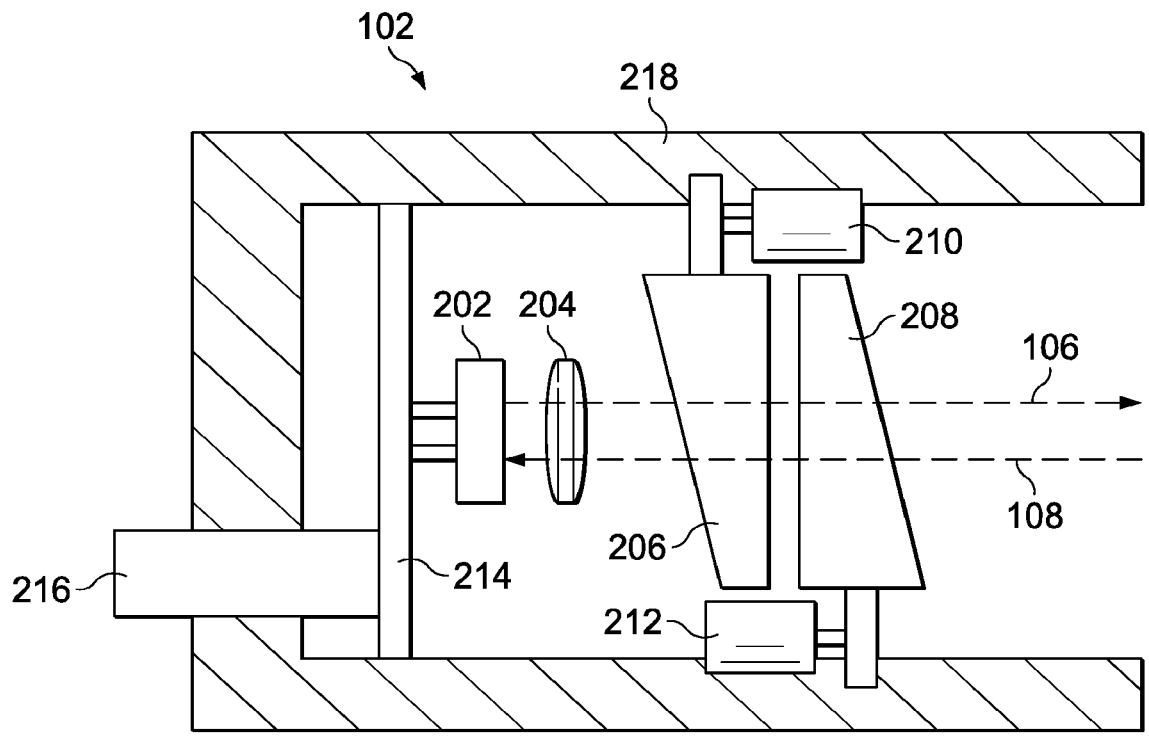
FIG. 2 shows a block diagram of a LIDAR system in accordance with various embodiments.

FIG. 2 shows a block diagram of LIDAR system 102 in accordance with various embodiments. In an embodiment, LIDAR system 102 includes monolithic transceiver 202, collimating optic 204, rotatable wedge prisms 206 and 208, motors 210 and 212, controller 214, data port/power connection 216, and housing 218. Monolithic transceiver 202 is configured to transmit a laser beam, such as laser beam 106, and receive reflected laser light, such as reflected laser light beam 108, from a target object, such as target object 104a. In some embodiments, the monolithic transceiver 202 is static. In other words, the monolithic transceiver 202 may be configured such that it does not move in relation to other components of the LIDAR system 102. Therefore, while the monolithic transceiver 202 may move along with, for example, an automobile that the LIDAR system 102 is mounted, the monolithic transceiver 202 may not move in relation to the collimating optic 204, the motors 210 and 212 and the housing 218. Thus, the monolithic transceiver 202 may always transmit laser beams, such as laser beam 106 and 110, in the same direction relative to the collimating optic 204 and housing 218.

Collimating optic 204 is an optic that is configured to narrow the transmitted laser beam, such as laser beam 106, to produce a collimated laser beam. In other words, the collimating optic 204 is configured to cause the direction of motion of the particles of the transmitted laser beam to become more aligned in the direction of the transmission by monolithic transceiver 202. Thus, the collimated laser beam is the transmitted laser beam with parallel rays.

The collimated laser beam (i.e., the transmitted laser beam with parallel rays) then may pass through wedge prisms 206 and 208. The wedge prisms 206 and 208 are rotatable and configured to steer, by refracting, the collimated laser beam in the direction of a first target object, such as target object 104a. The wedge prisms 206 and 208 may work as a Risley prism pair. In other words, by rotating wedge prism 206 in relation to wedge prism 208, the collimated laser beam may be steered due to the refraction of the collimated laser beam when it passes through the wedge prisms 206 and 208. For example, if wedge prism 206 is angled in the same direction as wedge prism 208, the angle of refraction becomes larger; however, if wedge prism 206 is angled in an opposite direction from wedge prism 208, then the angle of refraction is reduced, in some cases to the point where the collimated laser beam passes straight through the wedge prisms 206 and 208. Thus, by rotating the wedge prisms 206 and 208, the collimated laser beam may be steered.

Motor 210 is coupled to wedge prism 206 and may be configured to rotate the wedge prism 206. Motor 212 is coupled to wedge prism 208 and may be configured to rotate the wedge prism 208. Motors 210 and 212 may be any type of motor that is capable of rotating the wedge prisms 206 and 208. In some embodiments, motors 210 and 212 are servomotors. In other embodiments, the motors 210 and 212 are stepper motors or any other type of electric motor. Controller 214 is coupled to motors 210 and 212 and may act to provide control signals to the motors 210 and 212. Controller 214 may receive control instructions, in some embodiments, from a processor outside of LIDAR system 102 through data port/power connection 216. The control instructions then may act to control the motors 210 and 214 so that the wedge prisms 206 and 208 are positioned to steer the collimated laser beam to the target object 104. For example, the control instructions may cause controller 214 to send a control signal to motors 210 and 212 to rotate the wedge prisms 206 and 208 to a position such that the target object 104 is illuminated by the collimated laser beam. Housing 218 may be a rigid casing that encloses and protects the remaining components of LIDAR system 102. In the embodiment depicted in FIG. 2, the housing 218 has an opening in line with the direction of the transmission of laser beam 106 plus or minus 30 degrees. Thus, the laser beam 106 may be steered in any direction that is within 30 degrees of the direction of the transmitted laser beam 106.

For example, the LIDAR system 102 may be configured to scan directly in front of a moving automobile plus or minus 30 degrees for objects and determine the distance to any object within plus or minus 30 degrees of the direction the automobile is facing. In this example, controller 214 may receive control instructions that instruct the motors 210 and 212 to rotate the wedge prisms 206 and 208. The monolithic LIDAR transceiver 202 may transmit a laser beam 106 (i.e., drive pulse) through the collimating optic 204 in a first direction and the wedge prisms 206 and 208. Due to the relative positions (in terms of rotation) of the wedge prisms 206 and 208, the laser beam 106 (as a collimated laser beam) is refracted. Thus, wedge prism 206 may be in a first position while wedge prism 208 is in a second position. This causes the wedge prisms 206 and 208 to steer the laser beam 106 in a second direction. Once the laser beam 106 reaches target object 104a, reflected laser light beam 108 (i.e., return pulse) returns in a direction opposite (i.e., 180 degrees from) the second direction (i.e., the direction opposite the direction the laser beam 106 was travelling immediately after being refracted by wedge prisms 206 and 208) to the LIDAR system 102. The wedge prisms 206 and 208, maintaining their positions, then act to refract the reflected laser light beam 108 in a direction opposite (i.e., 180 degrees from) the first direction (i.e., the direction opposite the direction laser beam 106 travelled when transmitted). Thus, the wedge prisms 206 and 208 act as both the transmission and return path of the laser beam 106 and reflected laser light beam 108. This causes the reflected laser light beam 108 to be received by the monolithic transceiver 202. The monolithic transceiver 202 then may identify the distance to the target object 104a based on the TOF.

Figure 3:
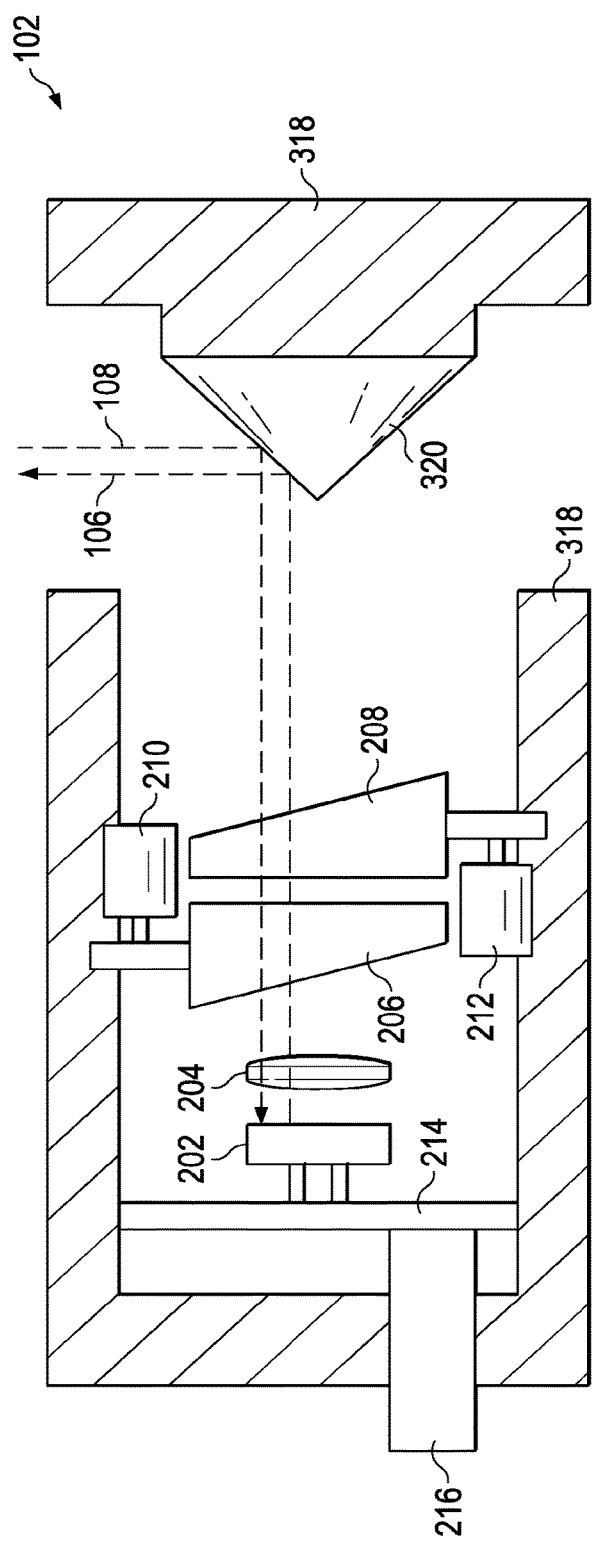
FIG. 3 shows a block diagram of a LIDAR system in accordance with various embodiments.

FIG. 3 shows a block diagram of LIDAR system 102 in accordance with various embodiments. In this embodiment, LIDAR system 102 includes monolithic transceiver 202, collimating optic 204, rotatable wedge prisms 206 and 208, motors 210 and 212, controller 214, data port/power connection 216, housing 318 and cone mirror 320. Therefore, the LIDAR system depicted in FIG. 3 is the same as the LIDAR system depicted in FIG. 2 except for housing 318 and the addition of cone mirror 320. Housing 318 may be a rigid casing that encloses and protects the remaining components of LIDAR system 102. In the embodiment depicted in FIG. 3, the housing 318 has an opening at a right angle with the direction of the transmission of laser beam 106 plus or minus 30 degrees. Cone mirror 320 may be any mirror that is in the shape of a cone that is configured to reflect a laser beam, such as laser beam 106, in some embodiments, in a direction at a right angle plus or minus 30 degrees from the direction of transmission of the laser beam 106.

For example, the LIDAR system 102 may be configured to scan a 360 degree panorama around a moving automobile and determine the distance to any object within the panorama. In this example, controller 214 may receive control instructions that instruct the motors 210 and 212 to rotate the wedge prisms 206 and 208. The monolithic LIDAR transceiver 202, which in this example may be directed directly up, may transmit a laser beam 106 (i.e., drive pulse) through the collimating optic 204 in a first direction and the wedge prisms 206 and 208. Due to the relative positions (in terms of rotation) of the wedge prisms 206 and 208, the laser beam 106 (as a collimated laser beam) is refracted. Thus, wedge prism 206 may be in a first position while wedge prism 208 is in a second position. This causes the wedge prisms 206 and 208 to steer the laser beam 106 in a second direction. The laser beam 106 then may reflect off of the cone mirror 320 in the direction of target 104a. The reflection off the cone mirror 320 may cause the laser beam 106 to travel in a third direction, a direction at a right angle plus or minus thirty degrees from the first direction (i.e., the direction laser beam 106 travelled when transmitted). In this example, because the laser beam 106 is transmitted directly up by the monolithic transceiver 202, the laser is reflected by the cone mirror 320 approximately horizontal (parallel to the roof of the automobile) plus or minus 30 degrees. Once the laser beam 106 reaches target object 104a, reflected laser light beam 108 (i.e., return pulse) returns in a direction opposite (i.e., 180 degrees from) the third direction (i.e., the direction opposite the direction the laser beam 106 was travelling immediately after being reflected off of cone mirror 320) to the LIDAR system 102. The reflected laser light beam 108 then reflects off the cone mirror 329 in a direction directly opposite (i.e., 180 degrees from) the second direction (i.e., the direction opposite the direction the laser beam 106 was travelling immediately after being refracted by wedge prisms 206 and 208). The wedge prisms 206 and 208, maintaining their positions then act to refract the reflected laser light beam 108 in a direction opposite (i.e., 180 degrees from) the first direction (i.e., the direction opposite the direction laser beam 106 travelled when transmitted). Thus, the wedge prisms 206 and 208 and cone mirror 320 act as both the transmission and return path of the laser beam 106 and reflected laser light beam 108. This causes the reflected laser light beam 108 to be received by the monolithic transceiver 202. The monolithic transceiver 202 then may identify the distance to the target object 104a based on the TOF. Thus, the laser beam 106 may be steered in any direction that is within 30 degrees of a right angle of the direction of the transmitted laser beam 106. This allows for a 360 degree scan by the LIDAR system 102 mapping the distance to various target objects within the field of the scan.

Figure 4:
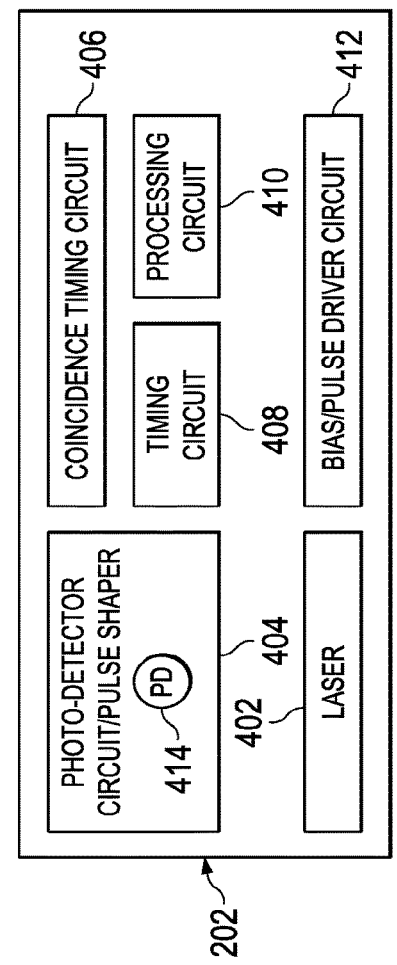
FIG. 4 shows a monolithic LIDAR transceiver in accordance with various embodiments.

FIG. 4 shows monolithic LIDAR transceiver 202 in accordance with various embodiments. Monolithic LIDAR transceiver 202 may comprise a laser 402, a photodetector circuit/pulse shifter circuit 404, a coincidence timing circuit 406, a timing circuit 408, a processing circuit 410, and a bias/pulse driver circuit 412 in a single integrated circuit. Laser 402 may be any device that emits light through amplification based on stimulated emission of radiation. In some embodiments, laser 402 is any type of laser diode. More particularly, in an embodiment, the laser 402 is a vertical-cavity surface-emitting laser (VCSEL) operating in pulse mode while in other embodiments, the laser 402 is a double heterostructure laser, a quantum well laser, a quantum cascade laser, a separate confinement heterostructure laser, a distributed Bragg reflector laser (DBR), a distributed feedback laser (DFB), or a vertical-external-cavity surface-emitting laser (VECSEL). Laser 402 may operate at any operating power, and in some embodiments, operates at 2-5 mW. The bias/pulse driver circuit 412 is hardware that causes forward electrical bias across the laser 402 to power the laser 402. Additionally, the bias/pulse driver circuit 412 may be configured to set the pulse width of the laser beam 106, 110 generated by laser 402. In some embodiments, the pulse width of the laser beams 106 and 110 is less than 30 ns. Thus, the bias/pulse driver circuit 412 may cause the laser 402 to transmit laser beams 106 and 110, each with a pulse duration of less than 30 ns.

The photodetector circuit/pulse shaper 404 may include a photodiode 414 that is configured to absorb photons received from the reflected laser light beams 108 and 112 into current to be processed by other components of the monolithic LIDAR transceiver 202. In some embodiments, the photodiode 414 is an avalanche photodiode (APD). Photodetector circuit/pulse shaper 404 may also be configured to pulse shape the transmitted laser beam 106,110 and/or the received reflected laser light beams 108 and 112. Coincidence timing circuit 406 includes hardware that determines coincidence timing of the received reflected laser light beams 108 and 112. Timing circuit 408 includes hardware that determines the TOF of the laser light beams 106 and 110 and their corresponding reflected laser light beams 108 and 112. Processing circuit 410 is configured to determine the distance to the target object 104 based on the TOF determined by timing circuit 408. Processing circuit 410 may be any type of processor including a digital signal processor.

Figure 5:
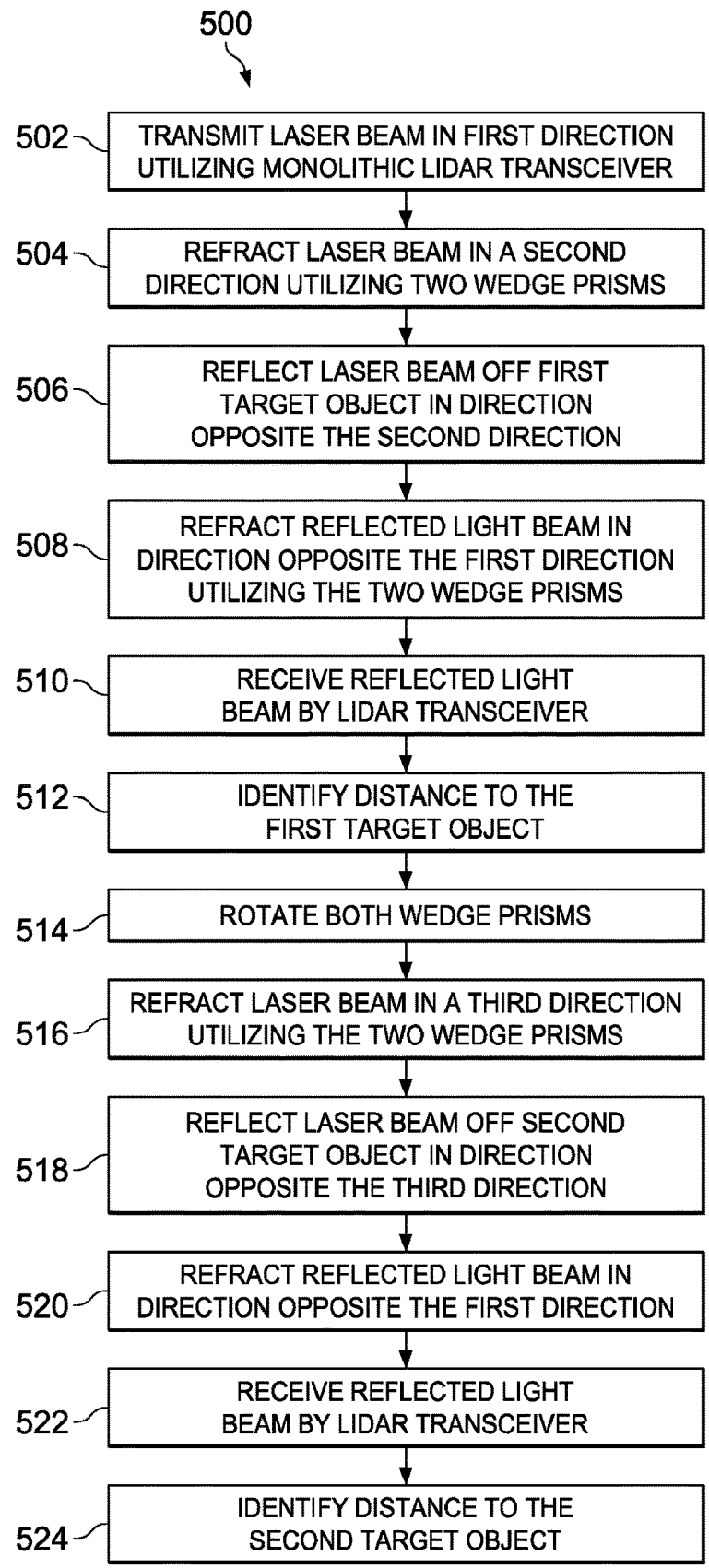
FIG. 5 shows a flow diagram of a method for determining distances to target objects in accordance with various embodiments.
Figure 6:
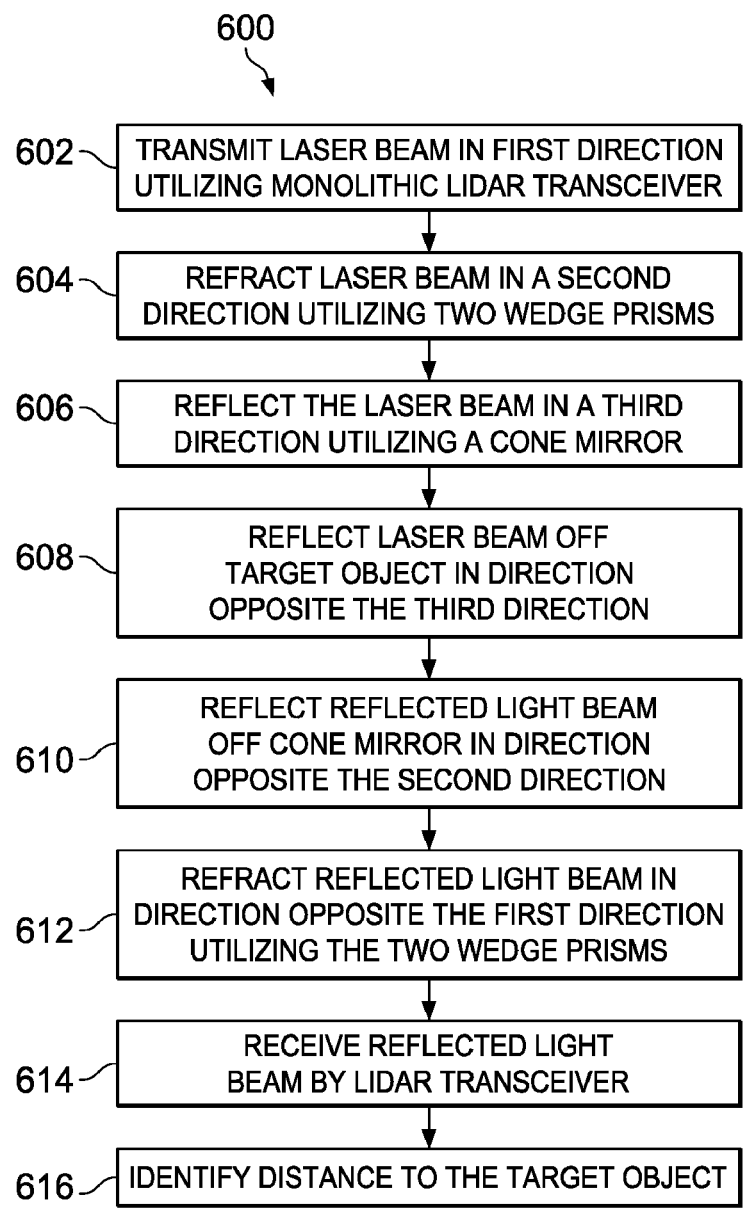
FIG. 6 shows a flow diagram of a method for determining distances to target objects in accordance with various embodiments.

FIG. 5 shows a flow diagram of a method 500 for determining distances to target objects, such as target objects 104, in accordance with various embodiments. FIG. 6 shows a flow diagram of a method 600 for determining distances to target objects, such as target objects 104, in accordance with various embodiments. Though depicted sequentially as a matter of convenience, at least some of the actions shown in methods 500 and 600 can be performed in a different order and/or performed in parallel. Additionally, some embodiments may perform only some of the actions shown or may perform additional actions. In some embodiments, at least some of the operations of the methods 500 and 600, as well as other operations described herein, can be performed by LIDAR system 102, including monolithic transceiver 202, collimating optic 204, controller 214, wedge prisms 206 and 208, motors 210 and 212, and/or cone mirror 320, implemented by a processor executing instructions stored in a non-transitory computer readable storage medium or a state machine.

The method 500 begins in block 502 with transmitting a first laser beam, such as laser beam 106, in a first direction utilizing a monolithic LIDAR transceiver, such as monolithic LIDAR transceiver 202. In block 504, the method 500 continues with refracting the transmitted first laser beam in a second direction utilizing two wedge prisms, such as wedge prisms 206 and 208. In an embodiment, the rotational position of the two wedge prisms with respect to one another determines the direction of the refraction. In some embodiments, the laser beam may be refracted by the two wedge prisms in any direction that is within 30 degrees of the direction of the transmitted laser beam. The method 500 continues in block 506 with reflecting the transmitted laser beam off a first target object, such as target object 104a, producing a reflected laser light beam, such as first reflected laser light beam 108. The first reflected laser light beam may travel in a direction opposite the second direction (i.e., 180 degrees from the direction of travel of the first laser beam immediately prior to reflecting off of the first target object). In block 508, the method 500 continues with refracting the reflected light beam in a direction opposite the first direction utilizing the two wedge prisms (i.e., 180 degrees from the direction of travel of the first laser beam as transmitted by the monolithic LIDAR transceiver). The method 500 continues in block 510 with receiving the first reflected laser light beam by the monolithic LIDAR transceiver. In block 512, the method 500 continues with identifying the distance to the first target object. In some embodiments, the distance to the first target object may be identified based on the amount of time between the transmitting of the first laser beam by the monolithic LIDAR transceiver and the receiving of the first reflected laser light beam by the monolithic LIDAR transceiver (i.e., the TOF).

The method 500 continues in block 514 with rotating both of the wedge prisms. In an embodiment, one or more motors, such as motors 210 and 212 may rotate the two wedge prisms in response to a control signal received from controller 214. In block 516, the method 500 continues with refracting a second laser beam, such as laser beam 110 in a third direction utilizing the two wedge prisms. The second laser beam may be transmitted by the monolithic LIDAR transceiver in the same direction relative to the two wedge prisms as the first laser beam. In an embodiment, the rotational position of the two wedge prisms with respect to one another determines the direction of the refraction. In some embodiments, the second laser beam may be refracted by the two wedge prisms in any direction that is within 30 degrees of the direction of the transmitted second laser beam. The method 500 continues in block 518 with reflecting the second laser beam off a second target object, such as target object 104n, which produces a second reflected laser light beam, such as reflected laser light beam 112. The second reflected laser light beam may travel in a direction opposite the third direction (i.e., 180 degrees from the direction of travel of the second laser beam immediately prior to reflecting off of the second target object). In block 520, the method 500 continues with refracting the second reflected light beam in a direction opposite the first direction utilizing the two wedge prisms (i.e., 180 degrees from the direction of travel of the second laser beam as transmitted by the monolithic LIDAR transceiver). The method 500 continues in block 522 with receiving the second reflected laser light beam by the monolithic LIDAR transceiver. In block 524, the method 500 continues with identifying the distance to the second target object. In some embodiments, the distance to the second target object may be identified based on the amount of time between the transmitting of the second laser beam by the monolithic LIDAR transceiver and the receiving of the second reflected laser light beam by the monolithic LIDAR transceiver (i.e., the TOF).

FIG. 6 shows a flow diagram of a method 600 for determining distances to target objects, such as target objects 104, in accordance with various embodiments. The method 600 begins in block 602 with transmitting a laser beam, such as laser beam 106, in a first direction utilizing a monolithic LIDAR transceiver, such as monolithic LIDAR transceiver 202. In block 604, the method 600 continues with refracting the transmitted laser beam in a second direction utilizing two wedge prisms, such as wedge prisms 206 and 208. In an embodiment, the rotational position of the two wedge prisms with respect to one another determines the direction of the refraction. In some embodiments, the laser beam may be refracted by the two wedge prisms in any direction that is within 30 degrees of the direction of the transmitted laser beam. The method 600 continues in block 606 with reflecting the laser beam in a third direction utilizing a cone mirror, such as cone mirror 320. In some embodiments, the cone mirror may reflect the laser beam in a direction at a right angle plus or minus 30 degrees from the direction of transmission of the laser beam. In block 608, the method continues with reflecting the transmitted laser beam off a target object, such as target object 104a, producing a reflected laser light beam, such as reflected laser light beam 108. The reflected laser light beam may travel in a direction opposite the third direction (i.e., 180 degrees from the direction of travel of the laser beam immediately prior to reflecting off of the first target object). The method continues in block 610 with reflecting the reflected laser light beam off the cone mirror in a direction opposite the second direction (i.e., 180 degrees from the direction of travel of the laser beam immediately after being refracted by the two wedge prisms). In block 612, the method 600 continues with refracting the reflected light beam in a direction opposite the first direction utilizing the two wedge prisms (i.e., 180 degrees from the direction of travel of the laser beam as transmitted by the monolithic LIDAR transceiver). The method 600 continues in block 614 with receiving the reflected laser light beam by the monolithic LIDAR transceiver. In block 616, the method 600 continues with identifying the distance to the first target object. In some embodiments, the distance to the first target object may be identified based on the amount of time between the transmitting of the laser beam by the monolithic LIDAR transceiver and the receiving of the reflected laser light beam by the monolithic LIDAR transceiver (i.e., the TOF).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   an integrated circuit including:
      a transceiver including a driver circuit and a pulse shaper, in which the driver circuit is configured to cause the transceiver to generate light, the transceiver is configured to receive reflected light, and the pulse shaper is configured to pulse shape the generated light;
   a collimating lens optically coupled to the transceiver and configured to:
      receive the pulse-shaped light; and
      transmit a collimated light;
   a wedge prism configured to direct the collimated light in a direction based on a position of the wedge prism.

2. The system of claim 1, wherein the wedge prism is a first wedge prism, the position is a first position, the direction is a first direction, and the system further comprises a second wedge prism, the second wedge prism configured to direct the collimated light based on the second wedge prism being in a second position.

3. The system of claim 2, further comprising:
   a first motor coupled to the first wedge prism, the first motor configured to rotate the first wedge prism; and
   a second motor coupled to the second wedge prism, the second motor configured to rotate the second wedge prism.

4. The system of claim 3, wherein the first and second wedge prisms are further configured to direct the collimated laser beam to a second direction based on the first wedge prism being in a third position and the second wedge prism being in a fourth position.

5. The system of claim 3, further comprising a controller coupled to the first and second motors, the controller configured to receive motor control signals and control operation of the first and second motors responsive to the motor control signals.

6. The system of claim 3, wherein the first and second motors are servomotors.

7. The system of claim 1, wherein the wedge prism is further configured to change a direction of the collimated light by plus or minus thirty degrees.

8. A method comprising:
   generating light by an integrated circuit including a transceiver, the transceiver including a driver circuit and a pulse shaper;
   performing, by the pulse shaper, pulse shaping on the generated light;
   receiving, by a collimating lens, the pulse-shaped light;
   transmitting, by the collimating lens, a collimated light;
   directing, by a wedge prism, the collimated light in a direction based on a position of the wedge prism; and
   receiving, by the transceiver, the reflected light.

9. The method of claim 8, further comprising identifying a distance to a first object based on an amount of time between the transmitting the light and the receiving the reflected light.

10. The method of claim 8, wherein the wedge prism is a first wedge prism, the direction is a first direction, and the method further comprises:
    rotating the first wedge prism into a third position;
    rotating a second wedge prism into a fourth position; and
    refracting, by the first wedge prism and the second wedge prism, at least one of the collimated light or the reflected light in a second direction.

11. The method of claim 8, wherein the direction is a first direction, and the method further comprises:
    reflecting, by a cone mirror, at least one of the collimated light or the reflected light in a second direction.

12. The method of claim 11, wherein the second direction is at a right angle plus or minus thirty degrees from the first direction.

13. The system of claim 1, wherein the driver circuit is configured to cause the transceiver to transmit a laser beam having a pulse duration of less than thirty nanoseconds.

14. The system of claim 1, wherein the transceiver further includes an avalanche photodiode; and
    wherein the avalanche photodiode is configured to receive the reflected light.

15. The method of claim 8, wherein generating the light comprises generating a laser beam having a pulse duration of less than thirty nanoseconds.

16. A device comprising:
    a laser;
    a photodetector circuit;
    a processing circuit;
    a driver circuit;
    a prism;
    a collimating lens optically coupled to the laser and the photodetector circuit;
    an actuator coupled to the prism; and
    a controller having a control output coupled to the actuator and configured to provide control signals at the control output to move the prism with respect to the laser and the photodetector circuit to set at least one of: a first direction of propagation of light from the laser, or a second direction of propagation of light incident upon the photodetector circuit.

17. The device of claim 16, wherein the laser comprises a vertical-cavity surface-emitting laser.

18. The device of claim 16, wherein the photodetector circuit comprises a silicon avalanche photodiode.

19. The device of claim 16,
further comprising a timing circuit configured to determine a time of flight of light received by the photodetector circuit, and
wherein the processing circuit is configured to determine a distance from the device to an object based on the time of flight.

20. The device of claim 16, wherein the driver circuit is configured to cause the laser to transmit a laser beam with a pulse duration of less than thirty nanoseconds.

21. The device of claim 16, wherein the control signals are motor control signals to set at least one of the first direction or the second direction by rotating the prism.

22. The device of claim 16, wherein the prism is a wedge prism.

23. The device of claim 16, wherein at least one of the laser, the photodetector circuit, the processing circuit, and the driver circuit is part of an integrated circuit, and the controller is configured to transmit the control signals external to the integrated circuit.

24. A device comprising:
an integrated circuit including a laser, a photodetector circuit, a processing circuit, and a driver circuit;
a prism;
an actuator coupled to the prism; and
a controller having a control output coupled to the actuator and configured to provide control signals at the control output to move the prism with respect to the laser and the photodetector circuit to set at least one of:
a first direction of propagation of light from the laser, or a second direction of propagation of light incident upon the photodetector circuit.

25. wherein the laser comprises a vertical-cavity surface-emitting laser.

26. The device of claim 25, wherein the photodetector circuit comprises a silicon avalanche photodiode.

27. The device of claim 25,
further comprising a timing circuit configured to determine a time of flight of light received by the photodetector circuit, and
wherein the processing circuit is configured to determine a distance from the device to an object based on the time of flight.

28. The device of claim 25, wherein the driver circuit is configured to cause the laser to transmit a laser beam with a pulse duration of less than thirty nanoseconds.

* * * * *